July 11, 1950 C. W. FRANKLIN 2,515,083

PIEZOELECTRIC SYSTEM

Filed Nov. 9, 1945 4 Sheets-Sheet 1

Inventor
Constance W. Franklin
by Roberts, Cushman & Grover
Att'ys.

PIEZOELECTRIC SYSTEM

Filed Nov. 9, 1945 4 Sheets-Sheet 2

| Interval | Effective Expanding Element | Air-Gap Height | Slope Proportional to | Change of Slope | Frequency Change |
|---|---|---|---|---|---|
| -25 to -10° | S | $w+\frac{9}{2}a$ | $-\frac{5}{2}a$ | a | 225 cycles |
| -10 to +5° | $S-\frac{2}{3}S$ | $w+2a$ | $-\frac{3}{2}a$ | a | 135 cycles |
| +5 to +20° | $S-\frac{4}{3}S$ | $w+\frac{1}{2}a$ | $-\frac{1}{2}a$ | a | 45 cycles<br>405 |
| 20° to +35° | $S-\frac{6}{3}S$ | $w+\frac{1}{2}a$ | $+\frac{1}{2}a$ | a | -45 cycles |
| 35° to 50° | $S-\frac{8}{3}S$ | $w+2a$ | $+\frac{3}{2}a$ | a | -135 cycles |
| 50° to 65° | -S | $w+\frac{9}{2}a$ | $+\frac{5}{2}a$ | a | -225 cycles<br>-405 |

Fig. 5

| Temp. | Compensator No. | | | | | |
|---|---|---|---|---|---|---|
| | 41 | 42 | 43 | 44 | 45 | 46 |
| -25 | -3a | -3a | -6a | -9a | -13a | -18a |
| -10 | -3a | -3a | -4a | -6a | -9a | -13a |
| +5 | -3a | -2a | -2a | -3a | -5a | -8a |
| +20 | -3a | -a | – | – | -a | -3a |
| +35 | -3a | – | +2a | +3a | +3a | +2a |
| +50 | -3a | a | +4a | +6a | +7a | +7a |
| +65 | -3a | +2a | +6a | +9a | +11a | +12a |

Fig. 4

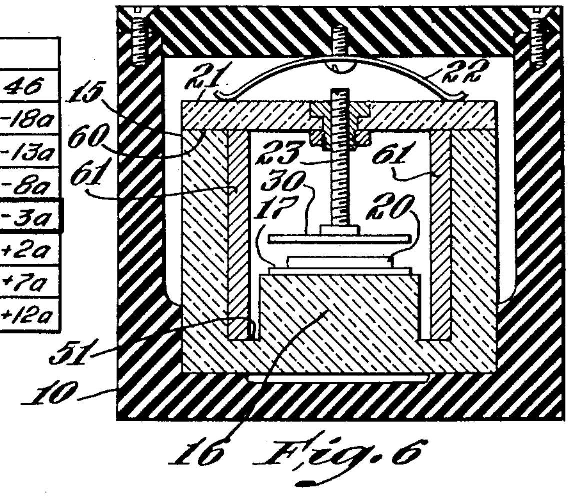

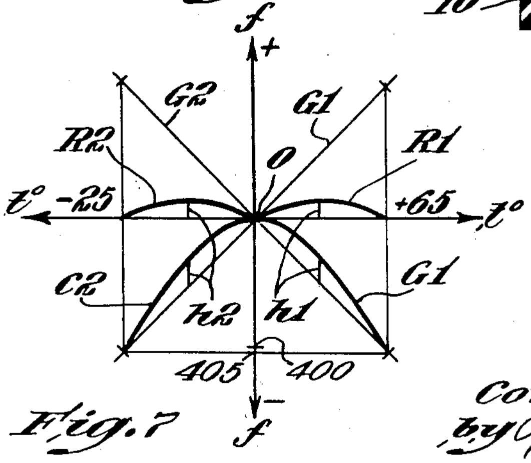

Inventor
Constance W. Franklin
by Roberts, Cushman & Grover
att'ys.

Inventor
Constance W. Franklin
by Roberts, Cushman & Grover
attys.

Inventor
Constance W. Franklin
by Roberts, Cushman & Grover
att'ys.

Patented July 11, 1950

2,515,083

UNITED STATES PATENT OFFICE 2,515,083

PIEZOELECTRIC SYSTEM

Constance W. Franklin, Belmont, Mass., assignor to Cambridge Thermionic Corporation, Cambridge, Mass., a corporation of Massachusetts Application November 9, 1945, Serial No. 627,719

32 Claims. (Cl. 171—327)

The present invention relates to piezoelectric systems and more particularly to a method of, and apparatus for compensating the frequency drift with temperature changes of piezoelectric units with crystals mounted therein for use in electrical systems.

It is well known that the oscillation frequency of piezoelectric crystals in electric fields is dependent upon the temperature of the crystal, and also upon the width of the gap which separates an electrode from a crystal surface, crystal and electrode being mounted in a holder conveniently constructed for the purpose of subjecting the crystal to an electric field prevalent between two electrodes, this gap between electrode and crystal being in many cases also variable with temperature. The function, that is, drift which relates the frequency of the crystal proper to its temperature is of non-linear, in particular instances parabolic nature, whereas the function relating the oscillating frequency of the unit with the width of the air gap between crystal and electrode, though non-linear for large differences in air gap height, is usually substantially of linear nature in the neighborhood of the value of any initial air gap. The shape of the non-linear drift due to the nature of the crystal proper, herein referred to as crystal drift can to some extent be controlled by cutting the crystal in peculiar ways. The drift in frequency due to air gap changes with temperature can be controlled by virtue of the fact that lessening of the gap that separates the crystal from an electrode lowers the frequency of the unit whereas increasing the gap increases the frequency of the unit; this drift usually but not necessarily linear, is herein referred to as gap drift. It has previously been proposed to compensate for linear crystal drift by the use of linear air gap drift induced by the linear expansion of metal supports, but it has so far been impossible to eliminate the effect of non-linear drifts with regard to the total performance of the crystal unit, particularly in the case of successively positive and negative frequency-temperature slopes such as occur in the large number of crystal types whose drift is parabolic.

It is the principal object of the invention to operate a piezoelectric unit in such a manner that the combined crystal and gap drift is reduced to values below any permitted error of compensation, over any desired drift range including both positive and negative frequency-temperature slopes, and to provide units which are substantially free of gap and crystal drift, which, without adjustment, cancel both positive and negative frequency-temperature slopes such as occur for example in the large number of crystals whose drift is essentially parabolic, and which are able automatically to cancel to any desired degree of accuracy any drift whether linear or non-linear.

Another object of the invention is to provide a piezoelectric unit containing a crystal the cut of which is selected not with a view as to the desirability of reducing crystal drift, but as to the possibility of correcting the total drift of the unit, or, if desired, to introduce a drift of predetermined configuration.

A further object of the invention is to provide a method of eliminating to any desired degree of accuracy the temperature conditioned non-linear crystal drift of a piezoelectric unit as well as the drift which is due to variations with temperature, of the gap between a face of the crystal and an adjacent electrode surface.

Still another object of the invention is to provide arrangements for carrying out the above method of compensation for a wide variety of crystal characteristics encountered in practice, in accurate and efficient, and yet very simple and reliable manner, involving a minimum of material, work, precision fitting, and moving connections, and requiring a minimum of space to be added to similar apparatus without provisions for compensation.

Additional objects of the invention are to provide piezoelectric units which introduce the above referred to compensation by means of temperature expansive bodies which fit easily into conventional crystal holders or boxes, or which can be easily added to such conventional mounts, and to provide such units which are as rugged and reliable as similar, but uncompensated units.

In one of its aspects, the invention provides the above referred to drift compensation by correlating the crystal of a piezoelectric unit, and one of its gap forming electrodes in such a manner that a selected region of non-linear crystal drift is compensated by an air gap drift in the same region, the gap drift being selected and applied with a slope (or in the case of non-linear gap drift, with an average slope) which is numerically equal but opposite in direction to the slope of the chord of the non-linear crystal drift curve section over this region, care being taken that the effective distance or height of each non-linear section over its chord, remains below the permitted error of compensation, which error value can be made, in accordance with the principle of the invention, sufficiently low to meet any practical requirements. Compensation of non-linear crystal drift by way of consecutive application of substantially linear gap drift increments may be accomplished by the operation of peculiarly selected and arranged compensator elements of correspondingly selected properties of thermal expansion, the effect of which is consecutively applied to the gap.

Another feature of the invention involves the application of the above referred to principle to parabolic crystal drifts, such that inherent geometric properties of the drift parabola are utilized to provide substantially equal residual errors of compensation, which can be rendered smaller than any prescribed tolerance.

In still another aspect of the invention, the gap of a piezoelectric unit can be changed, through a given temperature range, with rates of changes which correspond within selected regions to the slopes of chords of the non-linear crystal drift characteristic over these regions.

In a further aspect of the invention, the compensators according to the invention are arranged for consecutive action either serially or in parallel. For action of the compensators in parallel arrangement, the invention provides within the crystal unit a temperature expansive compensator suspension for an electrode and one, or several mechanically independent compensator supports for the crystal, or compensator supports for an electrode and a compensator suspension for the crystal, depending upon the configuration of the crystal drift characteristic, the compensator supports controlling, and taking over from each other the control of, the adjustment of the gap over a given range of the drift characteristic, with the aid of a common transmission or contactor link. For action in series, the above mentioned compensators are mechanically connected, the effect of their expansion being applied to the gap by means of a multiple transmission link or series of contactor members which construction also permits, if desired, the introduction of a scale modifying link between the compensators proper and the gap constituting element.

In a further aspect, the invention provides for gap variation in the same sense during temperature changes in opposite sense on either side of an intermediate temperature value, by deriving this gap variation for one side from subtractive effect of two compensators expanding or contracting in opposite direction, and for the other side from one compensator alone, the transition being accomplished by means of a stationary stop which effectively supports one compensator while permitting the other ineffectively to contract.

In yet another aspect of the invention, the above mentioned transition is accomplished by way of cooperation of several compensators of different length which vary in one direction with a counter compensator of intermediate length which varies in the other direction; on one side of the above mentioned intermediate temperature value the smaller variation of the shorter compensator is subtracted from that of the counter compensator, whereas on the other side the variation of the counter compensator is subtracted from the larger variation of the longer compensator.

In additional aspects, the invention contemplates the use of compensators which provide for differential gap adjustment by way of selected lengths, material, and peculiar location within the crystal unit such as to permit a great variety of possibilities of compensating crystal as well as gap drift characteristics of diversified configuration.

These and other objects, aspects and features will appear from the following description of several typical practical embodiments illustrating the novel general as well as more specific characteristics of my invention. This description refers to drawings in which Figs. 1 and 2 are diagrams illustrating the principle of the invention;

Figs. 4 and 5 are tables containing characteristic quantitative values of a unit according to Fig. 3;

Fig. 6 is a cross section, similar to Fig. 3, of another embodiment of the invention;

Fig. 7 is a diagram illustrating the operation of a unit according to Fig. 6;

Figure 1:
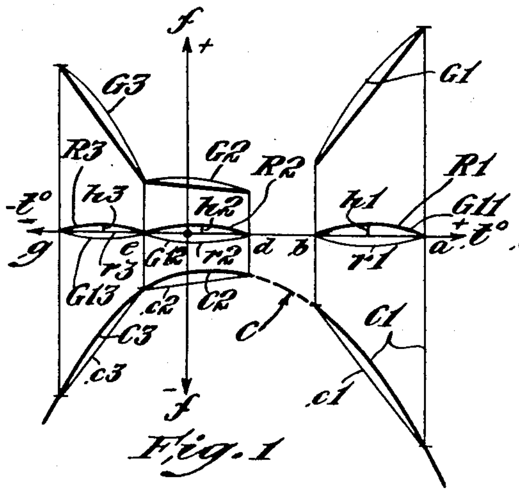

The general principles upon which the present invention is based will be first discussed with reference to Fig. 1.

In this figure, C represents the crystal drift characteristic, plotted in generalized form as a function of the temperature $t$ and the frequency $f$. Selecting any one or several regions for compensation, such regions are indicated by way of example at C1, C2 and C3. To compensate these regions of the crystal drift characteristic, gap drift characteristics G1, G2 and G3 are selected which, when subtracted from the crystal drift characteristics, approach to any desired degree a characteristic $f$=constant. Although, as mentioned above, the gap drift characteristics will usually be linear, Fig. 1 indicates them as of generally curved character, and it will be noted that they have bene so selected that the projections of opposite end points coincide on the $t$ axis, resulting in an actually constant $f$ value at the points $a$, $b$, $d$, $e$, $g$. It will, however, be understood that this is not the only possible, or perhaps not even the most exact way of combining crystal and gap drift characteristics of general configuration, and is merely given by way of example in order to avoid more complicated mathematical deductions. It will further be noted that, if the gap drift characteristics are substantially linear, they will have to be of slopes opposite to, but of the same values as the chords of the crystal drift sectors which correspond to the regions which are to be compensated. In other words, gap characteristic G1 is oppositely equal to chord $c1$, characteristic G2 is oppositely equal to $c2$, and G3 is oppositely equal to $c3$. The resultants of the combination of the linear average gap drifts and the chord of the crystal drifts are then the sections $r1$, $r2$, and $r3$, on the $t$ axis. Generally speaking the resultants of gap and crystal drift chord sections will be of the curved nature of sections G11, G12 and G13, as likewise indicated in Fig. 1. If now the varying distances of crystal drift sections C1, C2, C3 from their chords are superimposed upon the $t$ axis, the sections R1, R2 and R3 are obtained. It will be observed that they deviate from the ideal configuration, namely the $t$ axis, by values $h1$, $h2$, $h3$, which are the heights of the sections C1, C2, C3 over their chords. The dimension $h$ indicates the error or deviation of the ideal frequency characteristic from the one that can be actually obtained by the above outlined method of compensation. This error depends upon the lengths of the regions into which the crystal drift characteristic is subdivided; and in some instances upon the shape of non-linear gap characteristics.

Accordingly, if it is possible to cancel the polygonal crystal drift curve composed of the chords of the crystal characteristics as outlined above, only the drift represented by these repetitive errors will remain. The magnitude of this residual drift can then be controlled by the number of intervals into which the total temperature range of the crystal drift curve which is actually utilized is divided, and since the error decreases rapidly with such division of the crystal drift curve, the error can for practical purposes be eliminated.

Apparatus for performing this compensation has to operate by cancelling successively the drifts represented by the successive chords of the polygonal curve, whatever the magnitude of their slopes and whether they are positive or negative. It will now be understood that, although the crystal drift characteristics encountered will usually be continuous, and although the entire effective range of such a drift curve will usually have to be compensated, it is quite feasible to compensate one region or selected regions whether adjacent or not, either with the same degree of accuracy, or with different degrees of accuracy.

In selecting the arrangement for carrying out the compensation method according to the invention, use is made of the fact that lessening of the air gap which separates a crystal face from the corresponding electrode lowers the frequency of the entire unit, whereas an increase of the air gap increases the frequency of the unit. As mentioned above, this gap drift effect, though non-linear for large differences in air gap height, is substantially linear in the neighborhood of any initial air gap. Use is further made of the fact that air gap height may be linearly controlled by the use of the linear expansion of compensating bodies.

A practical embodiment of apparatus of this type will now be described with reference to Figs. 2 to 5.

Figure 2:
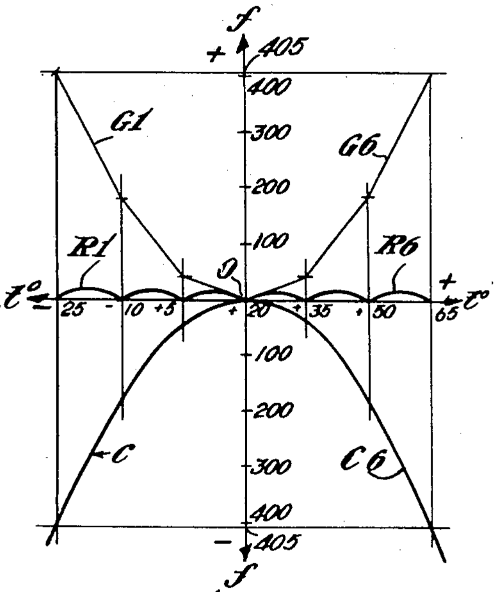

For purposes of this example, a typical BT crystal of 5500 kc. frequency will be considered. This crystal has normally a drift, expressed mathematically by the equation $$f=-\tfrac{1}{5}t^2$$

where $f$ is the frequency in cycles and $t$ the temperature change in degrees centigrade. This is a parabola whose origin is determined by the Z-angle of cut, lying approximately at 20° C. for a Z-angle of −49° 20′. A crystal cut at an angle of −49° 20′ and a temperature range which is symmetrically distributed about +20° C. through a range from −25° C. to +65° will be considered. Fig. 2 shows at C this portion of the curve including its extreme point or apex 0.

This parabola is approximated by an even number of chords each covering an interval of the same length along the $t$ axis, the middle two chords meeting at the apex 0. The closeness of the approximation is determined by the number of intervals and the length of the chords. In analyzing the approximation, two well known general properties of parabolas are pertinent, namely, (1) chords whose projections on the tangent at the vertex are equal, have the same height or separation (parallel to the axis of the parabola) from the parabola at all corresponding points, and (2) the slopes of successive chords having the same projection on the tangent, differ by a fixed amount.

From property 1 it follows that the maximum error introduced by the substitution of the polygonal curve for the parabola is fixed by the length of the original chord, being the exact amount that a horizontal chord covering the same number of degrees lies away from the vertex. In Fig. 2, where the chords are 15° C. in projected length, the error is 11¼ cycles. The entire error involved by the substitution of the polygonal curve is represented in Fig. 2 at R1 to R6, where successive lunes R1 to R6 are identical and all equal to the lune cut off between the horizontal chord and the parabola at the vertex.

A device which will operate to cancel the drift of the six chords of Fig. 2 will now be described with reference to Fig. 3.

Such a device must have essentially six pairs of expanding and contracting compensator elements which come into control successively, half of which must operate in the sense opposite to that of the other half, and which cooperate with a seventh compensator in order to reverse the drift correction.

Figure 3:
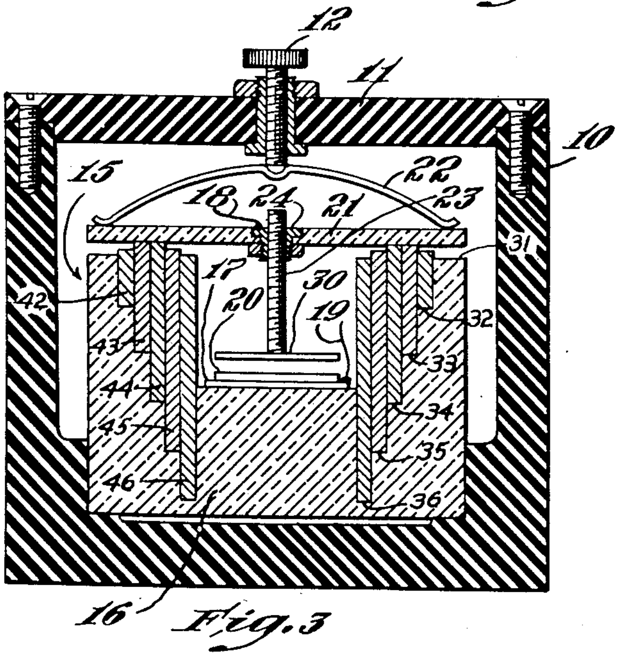
Fig. 3 is a cross section through a piezoelectric unit incorporating the principles of the invention.

In Fig. 3, numeral 10 denotes a container, for example of synthetic insulating material having a cover 11 with spring adjustment screw 12. Container 10 firmly engages a box 15 of fused quartz. Invar or other substance having substantially zero coefficient of expansion and having a central block or platform 16 upon which rests an electrode 17 and a piezoelectric crystal 20.

A fused quartz lid 21 is held down by a spring 22 contacting or fastened to adjustment screw 12 of cover 11. The lid 21, herein also referred to as contacting plate, carries a threaded conductive rod 23 turning in a sleeve 24 fastened to lid 21. Screw 23, herein also referred to as counter compensator, carries the upper electrode 30. The distance of electrode 30 from crystal 20, defining the air gap of the system, can be adjusted by means of screw 23. The electric connections leading to the electrodes are indicated at 18 and 19.

The effective length of the screw element 23, from the inner face of lid 21 to the inner face of electrode 30 may be designated S; this length is such that an element of length ⅗ S operating when the lid is resting on non-expanding supports, with the assigned room temperature (for example 20°) air gap, would cause at the extreme (for example −25° temperature) a frequency increase equal to the exact amount of crystal drift, for example 405 cycles (compare Fig. 2).

The inside of box 15 is finished with two step-like racks or shelves of fused quartz facing each other at opposite ends. Each rack is composed of 6 steps 31, 32, 33, 34, 35, 36, the height of each step except the uppermost being accurately ⅔ S, and the uppermost step, 31, being subject to the correction indicated below and furnishing the counter contacting element for supporting contacting edge of the box lid 21.

Upon each pair of corresponding steps of the racks rests one of five pairs of compensator bodies or bars 42, 43, 44, 45, 46 made of the same metal as screw element 23, running the full width of the box and being fitted with sufficient distance from each other to permit free individual expansion. The height of these compensators is such that at room temperature they come approximately (subject to the corrections described below) level with the top 31 of the box. Accordingly, at room temperature these approximate heights are

| Compensator | 42 | 43 | 44 | 45 | 46 |
|---|---|---|---|---|---|
| Approximate Height | 2/5 S | 4/5 S | 6/5 S | 8/5 S | 2 S |

These bars, and the uppermost quartz step, constituting resting face 31, are subject to the following height corrections:

Bars 43 and 44 on steps 33 and 34 are exactly of heights 4/5 S, 6/5 S at room temperature. The bars 43 and 44 on steps 33 and 34 are at room temperature shallower than 2/5 S and 8/5 S respectively, by the exact amount $a$ that a unit of the selected metal of length 2/5 S expands in a 15° C. interval. The fused quartz edge 21 of the box of approximate height 2/5 S over the preceding step and the bar 46 of approximate height 2 S, are shallower by $3a$ at room temperature than these approximate heights.

It should be kept in mind that, as indicated above, $a$ is the expansion of 2/5 S for 15°, that hence the expansion of 2 S is $5a$, and that of S is 5/2 $a$. It should be further remembered that unit 15 with face 21 is inexpansible, that 42 expands $a$ in each 15° interval, 43 expands $2a$, 44 expands $3a$, 45 expands $4a$ and 46 expands $5a$. By successive subtraction for decreasing and addition for increasing temperatures, the tabulation of Fig. 4 is obtained which is based on the condition at the standard temperature of +20° upon which Fig. 3 is also based. In other words, the figures given in this table indicate for each temperature the interval between the tops of the compensators and that position which the lower face of the plate 21 assumes at +20°, as shown in Fig. 3.

Inspection of the table Fig. 4 shows that during the first 15° interval above −25° C., at −10° the fused quartz edges of the box are higher than all the other bars, that at −10° they are overtaken by bars 42 which are higher than all the other bars for the next interval but are overtaken at +5° by bars 43 which remain higher than all other bars throughout the succeeding interval, when they are succeeded by bars 44, and so on. Thus one after another the pairs of bars succeed each other in supporting the box lid.

Since the expansion of screw element 23 (of length S at +20°) is always opposed to the upward thrust of the bars, we have in the successive 15° intervals from −25° to +65° the following effective expanding elements:

S, S—2/5 S, S—4/5 S, S—6/5 S, S—8/5 S, —S with the accompanying changes of air gap height:

$-5/2\ a, -3/2\ a, -1/2\ a, +1/2\ a, +3/2\ a, +5/2\ a$

As these last changes are proportional to the accompanying changes of frequency which they cause, and are each greater than its predecessor by an amount $a$, it will be seen that they provide the exact condition pointed out above as property 2 for the simulation of a parabola by a succession of chords.

The table given as Fig. 5 makes clear the manner in which this simulation is achieved for the parabola $y=-1/5\ t^2$ according to Fig. 2, with its origin 0 at +20°.

From this table it will be evident that element 23, of length S, if not compensated, would over a 45° interval produce a frequency change of three times 225, that is 675 cycles. This serves to provide an estimate of the various magnitudes involved in the device. It may be assumed that for an initial air gap of .0035 inch a change of .001 inch will produce a change of 700 cycles in a 5500 kc. crystal such as initially selected. The coefficient of expansion for an easily available type of aluminum is $25\times10^{-6}$ per unit, per degree centigrade. An inch of such aluminum would therefore change within a 45° temperature rang $25\times45\times10^{-6}$ inches or .001125 inch.

Assuming an initial gap of .0035 inch and a screw element 23 made of aluminum of the type mentioned above and one inch long at room temperature, then the conditions of the above table will be closely reproduced if $a$ is of the magnitude .00015 inch which is within the limits of the accuracy of a skilled machinist.

It will be evident that, if the unit is to be used in other than upright position, compensators 42 to 46 will be fastened with their lower ends to the corresponding ledges 32 to 36. It will be further evident that, instead of using pairs of equal componsator bars, compensator rings or tubes can be used in combination with a box of circular shape, with ledges 31 to 36 running concentrically around element 23 as axis. An axial section of such a circular box is exactly like that of a rectangular one as shown in Fig. 3.

In its simplest form, modified as will be pointed out below, a device of this type can be used for compensating crystal drifts of the general nature indicated in Fig. 2, by using only a single compensator pair. Such a device will now be described with reference to Fig. 6.

In this figure, 10 is again a container, 15 a box fashioned of quartz or other substance having substantially zero coefficient of expansion, 21 the lid of this box, also of fused quartz. 23 is a screw element of length S fastened to lid 21 which regulates the height of the upper electrode 30 above the crystal 20. Element 23 is made of such a metal and such length S, and the initial air gap is of such a height that, if the crystal rested on a fused quartz support forming part of the box, and the lid of the box were held down by pressure of the spring 22, the contraction $a$ of the element 23 involved in the lowering of temperature to −45° would increase the air gap by an amount which would raise the frequency exactly the 405 cycles represented by the downward drift of the uncompensated crystal operating at −25° C. The crystal unit thus compensated will then have at −25° exactly the same frequency as at peak. In order to compensate for the other branch of the crystal drift, the unit is further provided with a pair of metal compensator bars 61 (or a metal tube of corresponding dimensions) of exactly twice the length of the screw element 23 at room temperature and so supported on a shelf or groove 51 surrounding the outside of central platform 16 of the non-expanding box 15, as to be exactly flush with the edges 60 of the box at room temperature. Between 20° C. and −25° C. the element 61 of depth 2S contracts below the level of the fused quartz which therefore supports the lid so that the contracting upper electrode element 23 operates to cancel the frequency drift within this range as explained above. Between +20° C. and +65° C. the bar 61 of length 2S expands above the level of 60 of the fused quartz box 15 and therefore supports the contacting body or lid 21. At 65° it will have lifted the lid by an amount $2a$, while the upper electrode element will have lowered it by an amount $a$, thus providing once more an increase of $a$ in the width of the air gap, and once more cancelling the frequency drift over this range. The drift curve for the entire interval from +65° to −25° will now have the appearance indicated at R1, F2 of Fig. 7, which is analogous to Figs. 1 and 2 and provided with corresponding identification marks, so that it will be understood without further explanation.

It will be noted that the embodiment shown in Fig. 6 utilizes the non-expanding housing 15 in a manner different from that described above with reference to Fig. 3.

In the delayed expansion device according to Fig. 3, the gap change is reversed (at point 0 of Fig. 2) when the contacting plate 21 changes between compensators 43 and 44, which are smaller and larger, respectively, than counter compensator 23; edge 31 being effective at the lowest temperature.

In the embodiment according to Fig. 6, level 60 defines the instance of gap reversal corresponding to point 0 of Fig. 7, when control passes between counter compensator 23 alone and compensators 23 and 61 combined.

Another type of apparatus, delivering the same end and carrying out the method according to the invention, but involving in addition the sometimes desirable feature of a scale factor will now be described. This embodiment permits all above discussed compensations.

Figure 8:
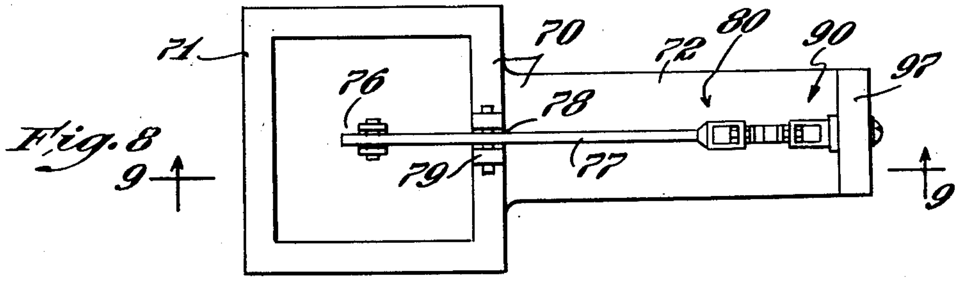
Fig. 8 is a top elevation of a unit constituting a third embodiment of the invention.
Figure 9:
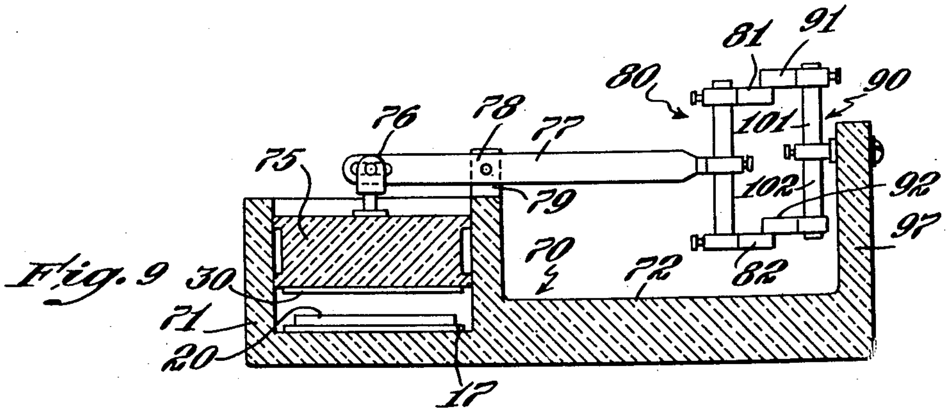
Fig. 9 is a section on line 9—9 of Fig. 8.

In a simple aspect of this embodiment of the invention shown in Figs. 8 and 9, the crystal 20 is supported by a rigid mounting block 70 of suitable insulating and non-expanding material and having a box portion 71 and a bracket portion 72. In the former, the crystal 20 rests on fixed electrode 17, whereas a movable electrode 30 is fastened to a movable plunger 75 of insulating material which slidingly fits the inside of box 71 in such a manner that parallelism is maintained as the upper electrode moves up or down. Making mechanical contact with this electrode through a slot and pin joint 76 is a non-expanding lever 77 resting on a fulcrum 78 including brackets 79 extending from block 70. Attached to the other end of lever 77 is a symmetrical bracket 80 of non-expanding material having two contacting elements such as prongs 81, 82. At room temperature, this bracket has its arms or prongs 81, 82 in contact with the two counter contacting elements or prongs 91, 92 of a metal bracket 90 with expanding compensator arms 101, 102 fixed at 96 to a non-expanding support column 97 which is integral with or firmly fastened to the above mentioned non-expanding bracket portion 72 of block 70.

Apparatus according to Figs. 8 and 9 operates as follows.

When the unit is raised in temperature, compensators 101 and 102 expand; compensator 102 depresses with prong 92 the lower prong 82 of the movable, counter contacting or transmitting bracket 80 and thus raises the upper electrode 30 by an amount determined by the length of compensator 102, the metal of which it is composed, the amount of the temperature change, and the scale factor introduced by the different lengths of the arms of lever 77. In this temperature interval compensator arm 101 is inoperative as it has moved higher and makes no contact with prong 81 on non-expanding arm 80. On the other hand, when the unit is cooled below room temperature, arm 101 contracts the same amount as 102 expanded, depresses the upper prong 81 of bracket 80 and again lifts the electrode. In this interval, 102 also contracts and is therefore out of contact with prong 82. It will be readily seen that this device carries out the operation described above with reference to Figs. 6 and 7, but without the need of a counter-compensating element such as rod 23 of Figs. 3 and 6, and with the possibility of a scale factor determined by the leverage of bar 77.

In order to obtain a more finely differentiated operation, such as described with reference to Figs. 2 to 5, a device analogous to that shown in Figs. 8 and 9 may be used, which will now be described with reference to Fig. 10.

Figure 10:
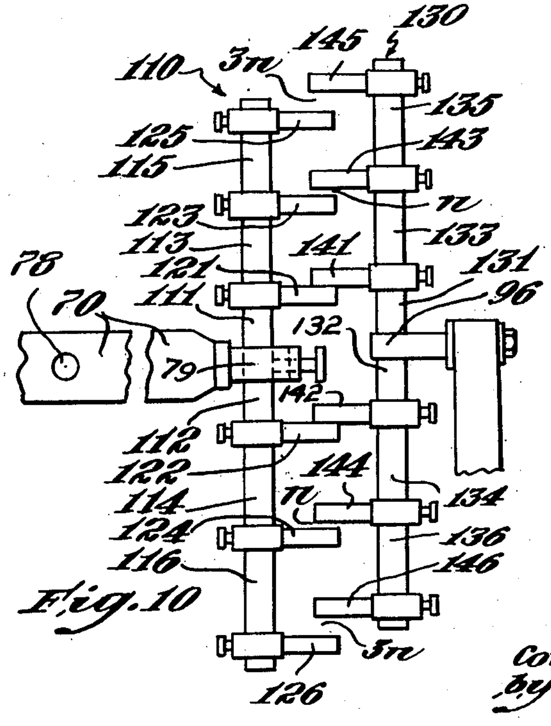
Fig. 10 is a view of the rake section of a fourth embodiment of the invention, otherwise similar to that according to Figs. 8 and 9.

In Fig. 10, the arms or brackets 80, 90 of Fig. 8 are replaced by a pair of rakes 110, 130. The movable rake 110 is fastened to lever 77 at 79 and has the innermost pair of transmitting elements 111, 112 evenly spaced about the middle at 79 and all subsequent transmitting elements 113, 114, 115, 116 spaced by half the separation of the inner elements. The transmitting rake 110 is of non-expanding material and carries contacting tines 121 to 126.

The second compensating rake 130 is fastened at its middle at 96 and has approximately the same separation of compensator elements 131 to 136 by counter contacting tines 141 to 146 as the first rake 110, subject however to certain corrections which will presently be discussed in connection with the operation of this embodiment of the invention. Otherwise, the construction of this unit is similar to that described with reference to Figs. 8 and 9.

Apparatus according to Fig. 10 operates as follows:

As in the device shown in Fig. 9, the pair of tines 121, 122 adjacent to the middle affixed at 79 is assumed to rest at room temperature in contact with the corresponding tines 141, 142 of the first rake. In this condition, the next pairs of tines 123, 143 and 124, 144 miss contact by an amount $n$ (Fig. 10) and the third pairs of tines 125, 145 and 126, 146 miss contact by $3n$, where $n$ is the distance a bar of a given length, of a certain metal contracts or expands in a 15° C. interval.

If the unit is now cooled below room temperature, the electrode will have been lifted $kn$ at 5° at C., where $k$ is the scale factor introduced by the unequal arm of lever 77. At −10° C. the second upper tine 143 will lie $4n$ nearer the center than it did initially, or $2n$ nearer than it did at the end of the first interval when it came into contact with its corresponding transmitter tine 13, and took over the lifting of the electrode. At −25° C. the third upper tine 145 will lie $9n$ nearer the center than it did initially. At the end of the first interval of cooling, tine 145 is $n$ behind its corresponding tine 115 which has been depressed $n$ by the action of tine 141. At the end of the second interval it is just in contact with its corresponding tine 115 which has been depressed $n$ by the action of tine 141. At the end of the second interval it is just in contact with its corresponding tine 115 which has traveled an additional $2n$ under pressure from 2; and in the last interval it travels $n+2n=3n$.

When the temperature increases, the other half of the rake operates in exactly the same way, also raising the electrode. Since the amounts the electrode is lifted are $kn$, $2kn$, and $3kn$, by suitably choosing initial lengths, materials and scale factor, the polygonal non-linear drift can again be canceled, according to the principle explained with reference to Figs. 1 and 2.

Figure 11:
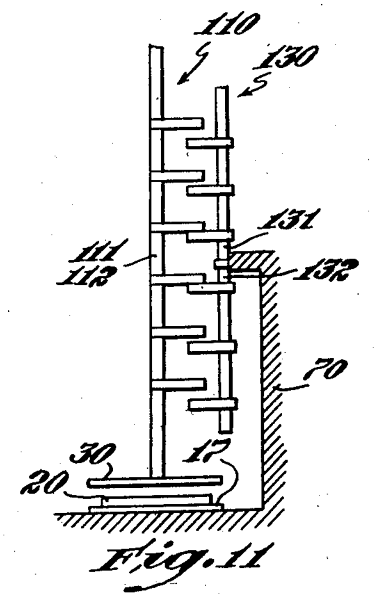
Fig. 11 is a diagrammatic elevation of a fifth embodiment of the invention.

It will be understood that the scale factor introducing element, for example lever 70 of Figs. 8, 9 and 10, may be omitted, resulting in a device which is diagrammaticaly shown in Fig. 11. In this figure, 110 and 130 are rake elements with compensator and counter compensator, and contacting and counter contacting elements analogous to those shown in Fig. 10. Unit 110 is directly connected to electrode 30, whereas unit 130 is fastened directly to non-expanding housing 70. The operation is similar to that explained above with reference to Fig. 10.

In the above described embodiments it was assumed that the crystal drift is characterized by frequency values which increase numerically with the temperature deviating from a standard valve, such drift being characteristic of BT cut crystals. Converse characteristics such as parabolic, apex downward drift of AT cut crystals can be similarly compensated.

Although it is not exactly correct to state that the frequency-temperature curve for an AT crystal of the same frequency as a BT crystal is equal and opposite to that of the BT crystal, it can be assumed with sufficient accuracy, for the sake of brevity in exposition, that there exists an AT crystal, of frequency 5500 kc., whose drift about an origin at 20° C. is represented by the relation: $y=+\frac{1}{5}t^2$.

The curve of this parabola is that which would be obtained by inverting Fig. 2 about the $t$ axis. Since this curve of AT crystals rises 405 cycles at the extremities $t=\pm45°$, it must be corrected by a device which depresses frequency by the same progressive amounts that the frequency of the BT crystal was raised. Such a device will now be described with reference to Fig. 12.

In this embodiment, the upper electrode body 30 is supported on a bridge element 211 by a shallow screw element 212 which permits adjustment of the precise air gap height. Bridge 211 rests on metal columns 223, 224 (constituting counter compensators analogous to element 23 of Fig. 3) which project from ledges or platforms 205, 206 of box 210. The lower electrode 17 with crystal 20, rests on non-expanding contacting plate 221 which is held in place by tension springs 214, 215 against a system of racks or ledges 231 to 236 and paired compensator bars 242 to 246 identical in construction with those for a unit of the BT crystal type, as described with reference to Fig. 3.

Figure 12:
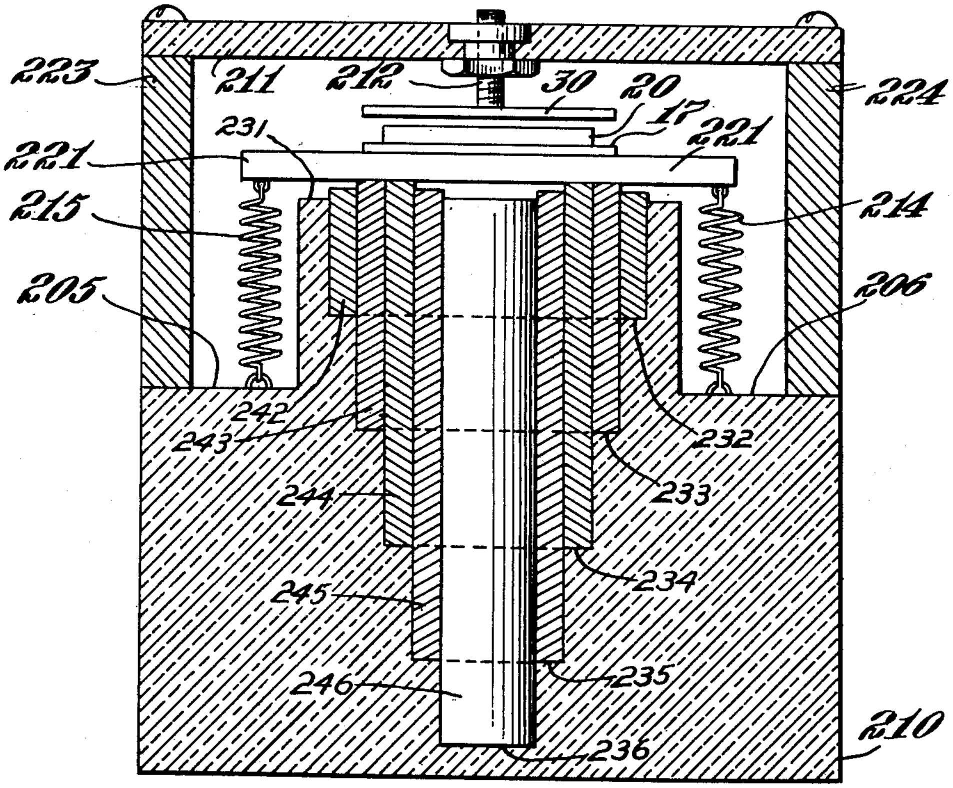
Fig. 12 is a cross section similar to Fig. 3 of a sixth embodiment.

In Fig. 12, the length of elements 223, 224 is equal to the difference of the distance between the highest and lowest faces of the metal compensators 242 to 246 and of the screw element 212. Otherwise, the magnitudes are precisely as they were in the embodiment described with reference to Fig. 3.

This unit operates as follows:

In the interval −25° to −10°, supports 223, 224 alone are active and produce a counter-drift of +225 cycles exactly balancing the chord in this interval. From −10° to +5° compensator 242 (or compensators depending whether pairs of bars, or tubular compensators are used) of $\frac{2}{5}$ S produces a counter-drift of +135 cycles; from +5° to +20°, compensator 243 of $\frac{4}{5}$ S produces a counter-drift of 45 cycles; from +20° to +35°, compensator 244 of $\frac{6}{5}$ S produces a counter-drift of −45 cycles; from +35° to +50°, compensator 245 of $\frac{8}{5}$ S produces a counter-drift of −135 cycles; and from +50° to +65°, compensator 246 of 2S produces a counter-drift of −225 cycles. Thus compensation similar to that explained with reference to Figs. 2 to 5 is accomplished.

Figure 13:
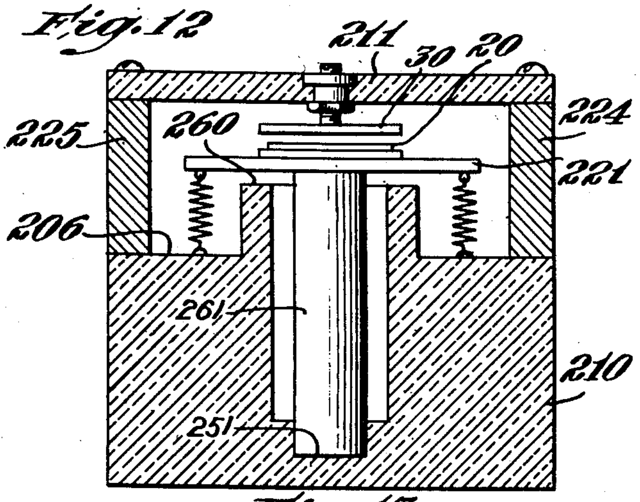
Fig. 13 is a cross section similar to Fig. 6, of a seventh embodiment.

A unit performing, for a crystal of the AT type, the compensation described above with reference to 7, is shown in Fig. 13. This figure is quite analogous to Fig. 6, but has in addition to compensator 261, counter-compensator 224, 226, a bridge 211, a contacting element 210 and counter contacting elements 206 such as shown in Fig. 12. The operation of a unit of this type will now be understood without further explanation.

Figure 14:
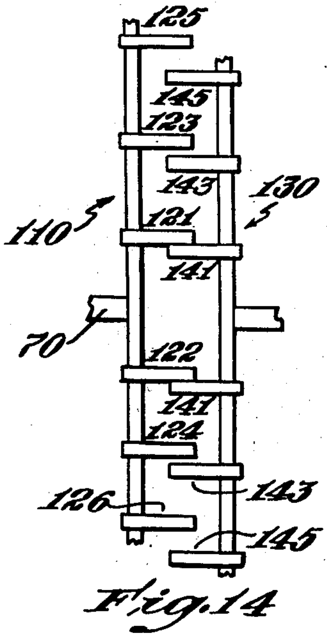
Fig. 14 is a schematical elevation, similar to Fig. 11, of an eighth embodiment of the invention.

The adaptation of rake type holders according to Figs. 8 to 11 to drift curves of the AT cut type is even simpler than the similar adaptation of the unit according to Fig. 3. It merely involves placing the expanding rake so that each tine lies on the opposite side of the corresponding tine of the non-expanding rake, as diagrammatically shown in Fig. 14 which, having in mind the identification marks corresponding to those of Fig. 10 needs no further explanation. Now expansion will lift the non-expanding rake and depress the air gap, and contraction will do likewise, resulting in compensation analogous to that indicated in Fig. 2 with the parabola inverted.

It will now be evident that the embodiments according to Figs. 3, 6 and 12 operate through an intermediate floating link 21, 221, which permits, for temperature deviation either way from normal, subtraction of the consecutive effects of graded compensators arranged for parallel action, from the continuous effect of expanding counter-compensator 23 or 223. On the other hand, the embodiments according to Figs. 9, 10, 11 and 14 permit directly consecutive application of the effect of serially arranged compensators.

It will also be understood that the embodiments according to Figs. 9, 10, 11, and 14 may incorporate expanding compensators as well as counter compensators constituting the respective rakes, and that the compensators may be carried on the scaling element 77 which may be any equivalent of the lever herein shown, as for example a fragmentary gear or friction sector. Also, in order to compress the space needed in such a device, the expanding rake may be broken into two parts and the two parts placed directly in front of each other, or they can be constructed so that they fill the same projected space. Further, a non-expanding rake can have its two parts bent around to engage the two parts of the expanding rake, a lever arm passing over a fulcrum as before to transmit displacement. The transmitting arm itself may then be bent to conform spatially.

It will further be evident that any of the above described embodiments can be adapted to correct unidirectional, irregular or non-symmetrical drift, such adaptation merely involving appropriate asymmetry with suitable adjustment of the dimensions and thermal properties of supports, links, and compensators, so that the correct elements overtake each other at the correct temperatures and do not interfere with each other elsewhere.

Concerning the effective properties of the compensators, it will be evident that a variety of metals or other substances of differing coefficients of expansion may be used instead of expanding elements of the same metal but of different lengths. A combination of both methods is also possible and may serve to compress the necessary size of the device. In such cases the above explained corrections in the length of the expanding elements have to be suitably adapted, which needs no further discussion in view of the above explanation of the principles involved.

It should be understood that the present disclosure is for the purpose of illustration only and that this invention includes all modifications and equivalents which fall within the scope of the appended claims.

I claim:

1. The method of compensating the frequency drift of a piezoelectric unit having an oscillating body whose frequency varies as a function of its temperature and which is separated by a gap from an electrode for applying an electric field thereto—characterized in that a selected region of non-linear crystal drift is compensated by an air gap drift in the same region, which gap drift is selected and applied with an average slope which is numerically substantially equal but opposite in direction to the slope of the chord of the drift curve section over that region, the height of the drift section over its chord being below the permitted error of compensation.

2. The method of compensating the frequency drift of a piezoelectric unit having an oscillating body whose frequency varies as a non-linear function of its temperature and which is separated by a gap from an electrode for applying an electric field thereto—characterized in that a selected region of non-linear crystal drift is compensated by a linear air gap drift in the same region, which linear drift is selected and applied with a slope which is numerically substantially equal but opposite in direction to the slope of the chord of the non-linear drift curve section over that region, the height of the non-linear drift section over its chord being below the permitted error of compensation.

3. The method of modifying the frequency drift of a piezoelectric unit having an oscillating body whose frequency varies as a non-linear function of its temperature and which is separated by a gap from an electrode for applying an electric field thereto—characterized in that consecutively adjacent regions of non-linear crystal drift are individually modified by linear air gap drifts in the same regions which are selected and applied with slopes which are numerically and directionally related to the slope of the chords of the non-linear drift curve sections over said regions so as to shift said crystal drift a predetermined amount for each temperature value, the complete non-linear drift range thus modified being subdivided in such a number of regions that the heights of the non-linear drift curve sections over their respective chords are below the permitted error of compensation.

4. The method of compensating the frequency drift of a piezoelectric unit having an oscillating body whose frequency varies as a non-linear function of its temperature and which is separated by a gap from an electrode for applying an electric field thereto—characterized in that selected regions of non-linear crystal drift are individually compensated by linear air gap drifts in the same regions which linear drifts are selected and applied with slopes which are numerically substantially equal but opposite in direction to the slopes of the chords of the non-linear drift curve sections over that region, the heights of the non-linear drift curve sections over their respective chords being below the permitted error of compensation.

5. The method of compensating the frequency drift of a piezoelectric unit with an oscillating body whose frequency varies as a non-linear function of its temperature and which is separated by a gap from an electrode for applying an electric field thereto—characterized in that consecutively adjacent regions of non-linear crystal drift are individually compensated by linear air gap drifts in the same regions which are selected and applied with slopes which are numerically substantially equal but opposite in direction to the slope of the chords of the non-linear drift curve sections over said regions, the complete non-linear drift range thus to be compensated being subdivided in such a number of regions that the heights of the non-linear drift curve sections over their respective chords are below the permitted error of compensation.

6. The method of compensating the frequency drift of a piezoelectric unit having an oscillating body whose frequency varies as a non-linear function of its temperature, with similar frequency values for two branches of different temperature values on either side of a standard temperature value and which body is separated by a gap from an electrode for applying an electric field thereto—characterized in that the crystal drifts of selected regions on both sides of said standard value are individually compensated by linear air gap drifts in the same regions, which linear drifts are selected with slopes which are oppositely inclined on respective sides of said standard value and which are numerically substantially equal but opposite in direction to the slopes of the chords of the non-linear drift curve sections over said regions, the heights of the drift curve sections over their respective chords being below the permitted error of compensation.

7. The method of compensating the frequency drift of a piezoelectric unit having an oscillating body whose frequency varies as a non-linear function of its temperature, with similar frequency values for two branches of different temperature values on either side of a standard temperature value and which body is separated by a gap from an electrode for applying an electric field thereto—characterized in that the crystal drifts of several consecutively adjacent regions on both sides of said standard value are individually compensated by linear air gap drifts in the same regions, which linear drifts are selected with slopes which are oppositely inclined on respective sides of said standard value and which are numerically substantially equal but opposite in direction to the slopes of the chords of the non-linear drift curve sections over said regions, the complete non-linear drift range to be compensated being subdivided in such a number of regions that the heights of the drift curve sections over their respective chords are below the permitted error of compensation.

8. The method of compensating the frequency drift of a piezoelectric unit with an oscillating body whose frequency varies as a parabolic function which is symmetric regarding the temperature variable and which body is separated by a gap from an electrode for applying an electric field thereto—characterized in that the crystal drifts of consecutive parabolic sectors whose projections on a temperature coordinate are of substantially equal length, are individually compensated by linear air gap drifts in the same regions which are selected and applied with slopes which are numerically substantially equal but opposite in direction to the chords of the non-linear drift parabola sections over said regions, the complete parabolic drift range to be compensated being subdivided in such a number of regions that the equal heights of the drift parabola sections over their respective chords are below the permitted error of compensation.

9. In a piezoelectric unit, the combination of an oscillating body whose frequency varies as a function of its temperature, and an electrode for applying an electric field to said body from which it is separated by a gap whose width likewise varies in accordance with said temperature—with means for supporting said body and said electrode, and distancing means adjustably connected to said supporting means for varying the width of said gap, said distancing means including compensator means which is dimensionally responsive to temperature and which is constructed and arranged to vary said gap width upon change of temperature of the unit so as to compensate with the drift of the gap the drift of said body in a selected region, said compensator means having temperature coefficient characteristics and effective dimensions adapted to vary the gap so as to produce a corresponding average gap frequency drift of a slope which is numerically substantially equal but opposite in direction to the slope of the chord of the crystal frequency drift curve section over said region, the height of the drift section over its chord being below the permitted error of compensation.

10. In a piezoelectric unit, the combination of an oscillating body whose frequency varies as a non-linear function of its temperature, and an electrode for applying an electric field to said body from which it is separated by a gap whose width likewise varies in accordance with said temperature—with means for supporting said body and said electrode, and distancing means adjustably connected to said supporting means for varying the width of said gap, said distancing means including compensator means which is dimensionally responsive to temperature and which is constructed and arranged to vary said gap width upon change of temperature of the unit so as to compensate with the essentially linear gap drift the essentially non-linear drift of said body in a selected region, said compensator means having temperature coefficient characteristics and effective dimensions adapted to vary the gap so as to produce a corresponding linear gap frequency drift of a slope which is numerically substantially equal but opposite in direction to the slope of the chord of the non-linear gap frequency drift curve section over said region, the height of the non-linear drift section over its chord being below the permitted error of compensation.

11. In a piezoelectric unit, the combination of an oscillating body whose frequency varies as a non-linear function of its temperature, and an electrode for applying an electric field to said body from which it is separated by a gap whose width likewise varies in accordance with said temperature—with means for supporting said body and said electrode, and distancing means adjustably connected to said support for varying the width of said gap, said distancing means including two compensator bodies which are dimensionally responsive to temperature and which are constructed and arranged consecutively to vary said gap width upon change of temperature of the unit in a given sense, so as to compensate with the linear drift of the gap the non-linear drift of said body in two selected regions, said compensator bodies having temperature coefficients and effective dimensions adapted to vary the gap so as to produce corresponding linear gap frequency drifts of slopes which are numerically substantially equal but opposite in direction to the slopes of the chords of the non-linear crystal frequency drift curve sections over said regions, the heights of the non-linear drift sections over their chords being below the permitted error of compensation.

12. In a piezoelectric unit, the combination of an oscillating body whose frequency varies as a non-linear function of its temperature, with similar frequency values for two branches of different temperature values on either side of a standard temperature value, and an electrode for applying an electric field to said body from which it is separated by a gap—with means for supporting said body and said electrode, and distancing means adjustably connected to said supporting means for varying the width of said gap, said distancing means including compensator bodies which are dimensionally responsive to temperature and which are constructed and arranged consecutively to vary said gap width in opposite sense upon temperature change of the unit in corresponding senses, so as to compensate with the linear drift of the gap the non-linear drift of said body in selected regions on both sides of said standard value, said compensator bodies having temperature coefficients and effective dimensions adapted to vary the gap so as to produce corresponding linear gap frequency drifts of slopes which are oppositely inclined on respective sides of said standard value and which are numerically substantially equal to the slopes of the chords of the non-linear crystal frequency drift curve sections over said regions, the height of the non-linear drift sections over their chords being below the permitted error of compensation.

13. A piezoelectric unit comprising an oscillating body whose frequency varies as a function of its temperature, an electrode body arranged for applying an electric field to said oscillating body, means for holding said oscillating body, means for holding said electrode body, one of said holding means being adapted to carry out a movement varying a gap between said bodies, a contacting member fastened to one of said holding means, a counter contactor member fastened to the other holding means, a thermoexpansive compensator member interposed between one of said bodies and one of said holding means, a thermoexpansive counter compensator member interposed between the other body and the other holding means, said contacting members being arranged to engage so as to render one of said compensator members inoperative during temperature change on one side of an intermediate value, and said compensator members being selected as to material and length and arranged to move upon temperature change their respective bodies in opposite sense, thereby to vary said gap in opposite sense during temperature changes on respective sides of said intermediate valve.

14. A piezoelectric unit comprising an oscillating body whose frequency varies as a function of its temperature, an electrode body arranged for applying an electric field to said oscillating body, means for holding said oscillating body, means for holding said electrode body, one of said holding means being stationary and including a contacting member and the other holding means being adapted to carry out a movement varying a gap between said bodies and including a counter contacting member arranged to meet said contacting member, a thermoexpansive compensator member interposed between said first holding means and said counter contacting member, and a thermoexpansive counter compensator member fastened between the other body and said movable holding means, said compensator member being longer than said counter compensator member and coming into subtractive cooperation with said counter compensator member during temperature change on one side of an intermediate value, whereas meeting of said contacting members renders said compensator member inoperative during temperature change on the other side of said value, thereby to vary said gap in opposite sense during temperature changes on respective sides of said value.

15. A piezoelectric unit comprising an oscillating body whose frequency varies as a function of its temperature, an electrode body arranged for applying an electric field to said oscillating body, a stationary base member, means for holding said oscillating body, means for holding said electrode body, both holding means being adapted to carry out a movement varying a gap between said bodies, a contacting member fixed to said base member, a counter contacting member fixed to one of said holding means, said contacting members being arranged to meet, a thermoexpansive compensator member interposed between one of said holding means and said base member, a thermoexpansive counter compensator member interposed between the other holding means and said base member, said compensator member being longer than said counter compensator member and coming into subtractive cooperation with said counter compensator member during temperature change on one side of an intermediate value, whereas meeting of said contacting members renders said compensator member inoperative during temperature change on the other side of said value, thereby to vary said gap in opposite sense during temperature changes on respective sides of said value.

16. A piezoelectric unit comprising an oscillating body whose frequency varies as a function of its temperature, an electrode body arranged for applying an electric field to said oscillating body, means for holding said oscillating body, means for holding said electrode body, one of said holding means being adapted to carry out a movement varying a gap between said bodies and including a contacting member, and three thermoexpansive compensator bodies interposed between said contacting member and the other holding means for expansion in a direction opposite to that of said compensator member, said contacting member being arranged for consecutive engagement with said compensator bodies, with a compensator body of the approximate effective length of said compensator means extending closest to said contacting member while a shorter and a longer compensator body respectively, end at distances from said contacting member said bodies being selected as to material and length to come successively into contact with said contactor means during respective temperature ranges so that said shorter body is inoperative through temperatures on one side of an intermediate value, while said longer body is operative through temperatures on the other side.

17. A piezoelectric unit comprising an oscillating body whose frequency varies as a function of its temperature, an electrode body for applying an electric field to said oscillating body from which it is separated by a gap, means for holding said crystal body, means for holding said electrode body, one of said holding means being adapted to carry out a movement varying said gap, and means for controlling said movement, said controlling means comprising two compensator bodies which are connected at a junction point to form a continuous actuator and which are at said junction point fastened to one of said holding means, two movement transmitting contacting means fastened to said actuator at its end points, two counter compensator bodies which are likewise connected to form a continuous actuator and which are at their junction point fastened to said other holding means, and two movement transmitting counter contacting means fastened to the end points of said second actuator, said compensator bodies being thermoexpansive and selected as to material and length to respond to temperature changes with dimensional changes of pre-determined slope of their time-temperature relation, and said contacting and counter contacting means being arranged to bring said compensator bodies individually into action for varying said gap in the same sense during temperature changes on either side of an intermediate value.

18. A piezoelectric unit comprising an oscillating body whose frequency varies as a function of its temperature, an electrode body for applying an electric field to said oscillating body from which it is separated by a gap, means for holding said crystal body, means for holding said electrode body, one of said holding means being adapted to carry out a movement varying said gap, movement translating means for introducing a scale factor and connected at one side to one of said holding means, and means for controlling said movement, said controlling means comprising two compensator bodies which are connected at a junction point to form a continuous actuator and which are at said junction point fastened to the other side of said translating means, two movement transmitting contacting means fastened to said actuator at its end points, two counter compensator bodies which are likewise connected to form a continuous actuator and which are at their junction point fastened to said other holding means, and two movement transmitting counter contacting means fastened to the end points of said second actuator, said compensator bodies being thermoexpansive and selected as to material and length to respond to temperature changes with dimensional changes of predetermined slope of their time-temperature relation, and said contacting and counter contacting means being arranged to bring said compensator bodies individually into action for varying said gap in the same sense during temperature changes on either side of an intermediate value.

19. A piezoelectric unit comprising an oscillating body whose frequency varies as a function of its temperature, an electrode body for applying an electric field to said oscillating body from which it is separated by a gap, means for holding said crystal body, means for holding said electrode body, one of said holding means being adapted to carry out a movement varying said gap, and means for controlling said movement, said controlling means comprising two compensating bodies which are connected at a junction point to form a continuous actuator and which are at said junction point fastened to one of said holding means, two movement transmitting contacting means fastened to said actuator at its end points, two counter contacting means which are fastened to said other holding means and arranged at one side of said contacting means, said compensating bodies being thermo expansive and selected as to material and length to respond to temperature changes with dimensional changes of pre-determined slope of their time-temperature relation, and said counter contacting means being distanced to bring said compensating means individually into action for varying said gap in the same sense during temperature changes on either side of an intermediate value.

20. A piezoelectric unit comprising an oscillating body whose frequency varies as a function of its temperature, an electrode body for applying an electric field to said oscillating body from which it is separated by a gap, means for holding said oscillating body, means for holding said electrode body, said holding means being guided with respect to each other to carry out a movement varying said gap and means for controlling said movement, said controlling means including two thermoexpansive compensator members, one end of each compensator member contacting one of said holding means whereas the other ends are arranged oppositely the other holding means defining stepped intervals from said other holding means, said members being selected as to material and length to respond to temperature changes with dimensional changes of different slope of the temperature-time relation so as to come into individual controlling action by contact with both holding means during consecutive temperature ranges.

21. A piezoelectric unit comprising an oscillating body whose frequency varies as a function of its temperature, an electrode body for applying an electric field to said oscillating body from which it is separated by a gap, means for holding said oscillating body, means for holding said electrode body, said holding means being guided with respect to each other to carry out a movement varying said gap, and means for controlling said movement, said controlling means including a series of thermoexpansive compensator members, one end of each of said compensator members contacting a series of stepped surfaces of one of said holding means whereas the other ends are stepped and arranged for individual contact with the other holding means, the distances of said stepped surfaces and the material and length of said compensator members being selected to respond to temperature changes with dimensional changes of different slope of the temperature-time relation, so as to come into individual controlling action by contact with both holding means during consecutive temperature ranges.

22. A piezoelectric unit comprising an oscillating crystal body whose frequency varies as a function of its temperature, an electrode body for applying an electric field to said body, a base block arranged for supporting one of said bodies and having a series of shelves at stepped distances from said body, a supporting plate having dependent therefrom means for holding the other one of said bodies, said bodies being separated by a gap, and a series of thermoexpansive compensator bodies extending between respective ones of said shelves and said plate, the distance of said shelves and the material and length of said compensator bodies being so selected that they expand at different rates and come successively into contact with said plate, to vary said gap at different rates during respective successive temperature ranges.

23. A piezoelectric unit comprising an oscillating crystal body whose frequency varies as a function of its temperature, an electrode body for applying an electric field to said body, a base block having a series of stepped shelves, a bridge resting on said base block, means for fastening one of said bodies to said bridge depending therefrom, a supporting plate for holding the other one of said bodies to form said gap, means for urging said plate towards said shelves, a series of thermoexpansive compensator bodies extending between respective ones of said shelves and said plate, the distance of said shelves and the material and length of said compensator bodies being so selected that they expand at different rates and come successively into contact with said plate, to vary said gap at different rates during successive temperature ranges.

24. A piezoelectric unit comprising an oscillating body whose frequency varies as a function of its temperature, an electrode body for applying an electric field to said oscillating body from which it is separated by a gap, means for holding said oscillating body, means for holding said electrode body, one of said holding means being adapted to carry out a movement varying said gap, and means for controlling said movement, said controlling means including two compensator bodies which are connected at a junction point to form a continuous actuator, means for fastening an end of one of said bodies to one of said holding means, two movement transmitting contacting means fastened to said junction point and the free end of the other body respectively, two counter compensator bodies likewise connected at a junction point to form a continuous actuator, means for fastening an end of one of said counter compensator bodies to the other holding means, two movement transmitting counter contacting means fastened to said junction point and the free end of the other counter contacting means and adapted to engage corresponding ones of said contacting means on the same side thereof, said compensator bodies being thermoexpansive and selected as to material and length to respond to temperature changes with dimensional changes of predetermined slope of their time-temperature relation, and said contacting and counter contacting means being arranged to bring said compensator bodies individually into action for varying said gap in the same sense but with different slopes during temperature changes in one sense.

25. A piezoelectric unit comprising an oscillating body whose frequency varies as a function of its temperature; an electrode body for applying an electric field to said oscillating body from which it is separated by a gap; means for holding said oscillating body; means for holding said electrode body, one of said holding means being adapted to carry out a movement varying said gap; means for controlling said movement, said controlling means including two compensator bodies which are connected at a junction point to form a continuous actuator, means for fastening an end of one of said bodies to one of said holding means, two movement transmitting contacting means fastened to said junction point and the free end of the other body, respectively, two counter compensating bodies likewise connected at a junction point to form a continuous actuator, two movement transmitting counter contacting means fastened to said junction point and the free end of the other contacting means and adapted to engage corresponding ones of said contacting means on the same side thereof; and movement translating means for introducing a scale factor and connected at one side to one of said fastening means and at the other side to the respective holding means; said compensator bodies being thermo expansive and selected as to material and length to respond to temperature changes with dimensional changes of pre-determined slope of their time-temperature relation, and said contacting and counter contacting means being arranged to bring said compensator bodies individually into action for varying said gap in the same sense with different slopes during temperature changes in one sense.

26. A piezoelectric unit comprising an oscillating body whose frequency varies as a non-linear function of its temperature, an electrode body for applying an electric field to said oscillating body from which it is separated by a gap, means for holding said electrode body, one of said holding means being adapted to carry out a movement varying said gap, and means for controlling said movement, said controlling means including two compensator bodies which are connected at a junction point to form a continuous actuator, means for fastening an end of one of said bodies to one of said holding means, two movement transmitting contacting means fastened to said junction point and the free end of the other body respectively, a thermoinvariant body fastened to the other holding means, two counter contacting means fastened to said invariant body and adapted to engage corresponding ones of said contacting means on the same sides thereof, said compensator bodies being thermoexpansive and selected as to material and length to respond to temperature changes with dimensional changes of pre-determined slope of their time-temperature relation, and said contacting and counter contacting means being arranged to bring said compensator bodies individually into action for varying said gap in the same sense but with different slopes during temperature changes in one sense.

27. A piezoelectric unit comprising an oscillating crystal body whose frequency varies as a function of its temperature, an electrode body for applying an electric field to said crystal body, a base block having platform means for supporting one of said bodies and a series of shelves at stepped distances from said platform means, a contacting plate arranged for supporting one of said bodies, thermoexpansive compensator means holding one of said bodies adjacent the other body and forming therewith a gap, and extending from said series of shelves toward said contacting plate a series of thermoexpansive compensator bodies, respectively, the distance of said shelves from said platform means and the material and length of said compensator bodies being so selected that they expand at different rates and come successively into contact with said plate to vary said gap at different rates during respective successive temperature ranges, and said compensator means having an effective length value intermediate those of said compensator bodies, so that said gap varies in the same sense during temperature ranges on either side of an intermediate temperature value, proportionate to the difference in expansion of said compensator means and respective ones of said compensator bodies.

28. A piezoelectric unit comprising an oscillating crystal whose frequency varies as a function of its temperature; an electrode for applying an electric field to said crystal; a base block made of substantially thermoinvariant material and having a central platform for supporting said crystal and on either side of said platform a series of shelves at stepped distances from the platform; an electrode supporting contacting plate made of substantially thermoinvariant material and having dependent therefrom a thermoexpansive compensator rod carrying said electrode adjacent to and forming a gap with said crystal; and extending from said series of shelves towards said contacting plate a series of thermoexpansive compensator bodies, respectively, the distance of said shelves from said platform and the material and length of said compensator bodies being so selected that they expand at different rates and come successively into contact with said plate to vary said gap at different rates during respective successive temperature ranges, and said compensator rod having an effective length value intermediate those of said compensator bodies, so that said gap varies in the same sense on either side of an intermediate temperature value, proportionate to the difference in expansion of said compensator rod and respective ones of said compensator bodies.

29. A piezoelectric unit comprising an oscillating crystal whose frequency varies as a function of its temperature; an electrode for applying an electric field to said crystal; a base block made of substantially thermoinvariant material and having two platforms and between said platforms a series of shelves at stepped distances from the platforms; a bridge extending over said platforms; a contacting plate made of substantially thermoinvariant material and supporting said crystal adjacent to and forming a gap with said electrode; thermoexpansive compensator columns extending between said platforms and said bridge; and extending from said series of shelves towards said contacting plate a series of thermoexpansive compensator bodies, respectively, the distance of said shelves from said platforms and the material and length of said compensator bodies being so selected that they expand at different rates and come successively into contact with said plate to vary said gap at different rates during respective successive temperature ranges, and said compensator columns having an effective length value intermediate those of said compensator bodies, so that said gap varies in the same sense on either side of an intermediate temperature value, proportionate to the difference in expansion of said compensator columns and respective ones of said compensator bodies.

30. A piezoelectric unit comprising an oscillating crystal whose frequency varies as a function of its temperature; an electrode for applying an electric field to said crystal, a base block of substantially thermoinvariant material having platform means and therebetween a series of shelves at stepped distances from the platform means; thermoexpansive compensator means extending from said platform means; a thermally invariant bridge resting on said compensator means; means for fastening said electrode to said bridge; extending from said shelves towards said electrode a series of thermoexpansive compensator bodies; a contacting plate of thermally invariant material extending over said bodies and adapted for supporting said crystal to form a gap with said electrode; and means for urging said plate towards said compensator bodies; the distance of said shelves from said platform means and the material and length of said compensator bodies being so selected that they expand at different rates and come successively into contact with said plate to vary said gap at different rates during successive temperature ranges, and the length of said compensator means having an effective value intermediate those of said compensator bodies so that said gap increases on one side of an intermediate temperature value and decreases on the other side of said value.

31. A piezoelectric unit comprising an oscillating body whose frequency varies as a function of its temperature, an electrode body for applying a electric field to said oscillating body from which it is separated by a gap, means for holding said crystal body, means for holding said electrode body, one of said holding means being adapted to carry out a movement varying said gap, an actuator including a plurality of thermoexpansive compensator bodies serially fastened to each other at points of junction and carrying at said juncture points movement transmitting contacting means, a counter actuator including a plurality of thermoexpansive counter compensator bodies serially fastened to each other at points of junction and carrying at said juncture points counter contacting means on one side of and corresponding to said contacting means, means for contacting one of said actuators to one of said holding means, and means for fastening said counter actuator to the other holding means, said compensating and counter compensating bodies being of such material and length and said contacting and counter contacting means being so spaced that they come in consecutive contact as the lengths of said bodies change with temperature, to vary said gap at different rates during respective successive temperature ranges.

32. A piezoelectric unit comprising an oscillating crystal whose frequency varies as a function of its temperature; an electrode for applying an electric field to said crystal; a base block for supporting said crystal; a carrier block supporting said electrode opposite said crystal to define said gap and guided for movement relatively to said base block; a rake structure including a number of thermoexpansive compensator rods joined end to end with contacting tines fixed to the junction points; a counter contacting structure including a thermally invariant body extending substantially over the length of said rake structure and having counter contacting tines adapted to contact one side of corresponding ones of said contacting tines; movement transmitting means linking a point of said rake structure to one of said blocks; and means for mounting said counter contacting structure on said other block; the lengths and material of said compensator rods, and the respective distances of said tines being so selected that they expand at different rates so that said tines come successively into contact with each other, to vary said gap at different rates during respective successive temperature ranges.

CONSTANCE W. FRANKLIN.

REFERENCES CITED

The following references are of record in the file of this patent:

UNITED STATES PATENTS

| Number | Name | Date |
|---|---|---|
| 1,783,131 | Ohl | Nov. 15, 1930 |
| 1,994,228 | Osnos | Mar. 12, 1935 |
| 2,001,217 | Scofield | May 14, 1935 |